No. 694,021. Patented Feb. 25, 1902.
J. A. MEAD.
HOLDER FOR DENTAL DEVICES.
(Application filed May 29, 1901.)
(No Model.)
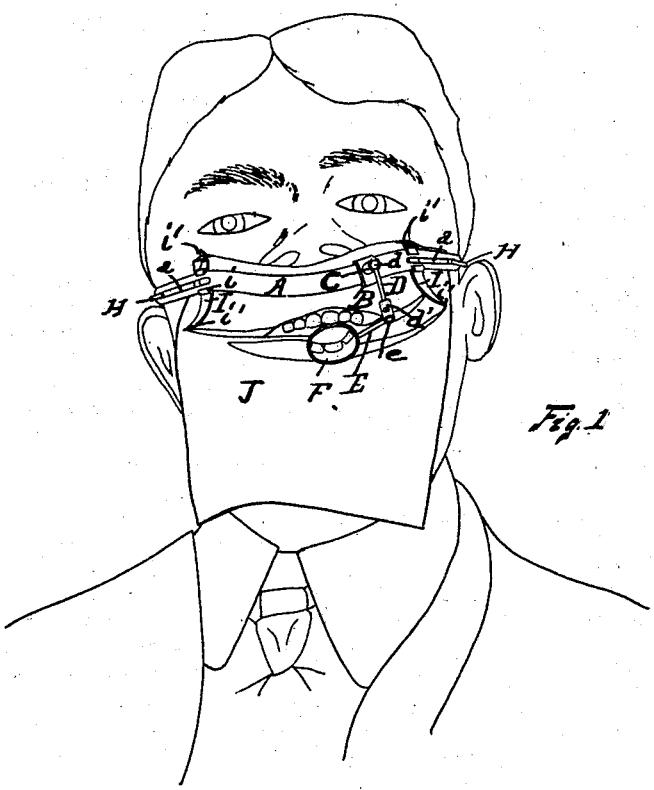
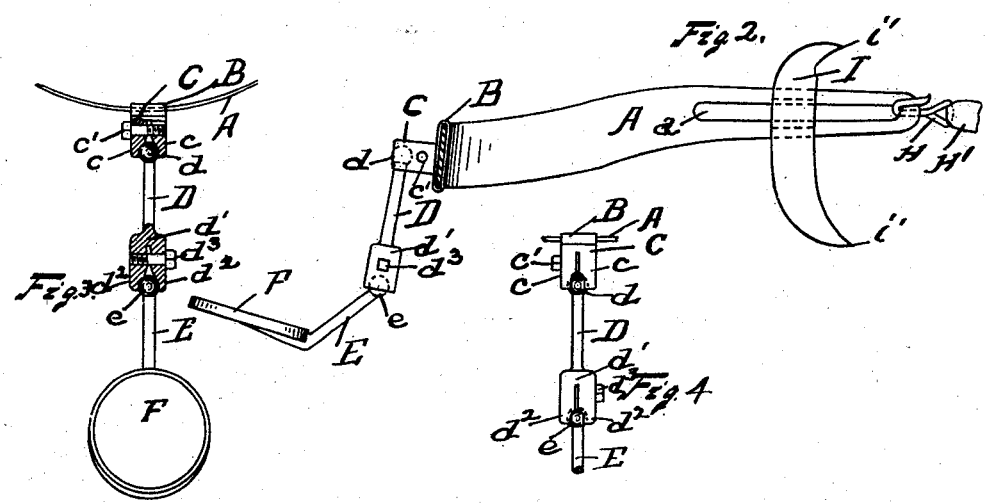
Witnesses
Rena F. Langa
J. Keesit Hallock
Inventor
James A. Mead
by N. L. Lord
Atty.

UNITED STATES PATENT OFFICE.

JAMES A. MEAD, OF CORRY, PENNSYLVANIA.

HOLDER FOR DENTAL DEVICES.

SPECIFICATION forming part of Letters Patent No. 694,021, dated February 25, 1902.

Application filed May 29, 1901. Serial No. 62,400. (No model.)

*To all whom it may concern:*

Be it known that I, JAMES A. MEAD, a citizen of the United States, residing at Corry, in the county of Erie and State of Pennsylvania, have invented certain new and useful Improvements in Holders for Dental Devices; and I do hereby declare the following to be a full, clear, and exact description of the invention, such as will enable others skilled in the art to which it appertains to make and use the same.

This invention relates to mirror and rubber-dam holders for use in dentistry; and it consists in certain improvements in the construction thereof, as will be hereinafter fully described, and pointed out in the claims.

The purpose of this invention is to provide a convenient holder for mirrors and rubber dams as used by dentists, either together or separately.

The invention is illustrated in the accompanying drawings, as follows:

Figure 1 shows a holder in place. Fig. 2 shows a side elevation of the holder. Fig. 3 shows a top view of the mirror-holding device, a part being in section to better show construction. Fig. 4 is a like view, none of the parts being in section.

A marks the holding-bar. This is made of light material and is arranged to conform to the shape of the face, passing beneath the nose around the upper lip. It has the slots $a$ at the ends, into which a hook H may be placed, the hook H being secured to an elastic material H' of sufficient length to pass around the head. Arranged on the bar is a sliding block B, and on this block are the sockets C. A lever D is provided with the ball $d$, which fits into the socket C. The lower end of the lever D is provided with a socket $d'$, into which fits a ball $e$. The lever E extends from the ball $e$, and the mirror F is secured to the lever. The socket C has the two parts $c\ c$, which may be drawn together by the screw $c'$ to give a sufficient friction to the joint to hold the lever D in position. The socket $d'$ is provided with the parts $d^2\ d^2$, and the screw $d^3$ for giving a like adjustment to the joint on the ball $e$. It will be noted that the bar A is arranged so that the wide surface is brought next to the face, so that it can readily conform to the shape of the face. The block C, sliding on this bar, is ordinarily given sufficient frictional resistance to hold it in any position to which it is adjusted. Its contact, however, with the surface back of the bar facilitates the holding of the block in position.

At the ends of the bar A are arranged the cross-pieces I I. These have small lugs $i$ extending over the bar A, so as to hold the cross-pieces in place. The cross-pieces are arranged to slide on the bar A and are preferably provided with outwardly-extending points $i'$. A rubber dam is placed under the bar A and is engaged by the points $i'$. These points engage the rubber without cutting it, and the rubber may be drawn taut across the face by sliding the cross-pieces along on the bar. The grasp of the bar and cross-pieces on the rubber holds it taut and in position. This is practically true, because the rubber is between the bar and the face. It will be noted, as arranged, that the mirror can be thrown up out of the mouth by simply moving the lever D without changing the adjustment of the lever E. This is important, as the patient may be allowed to close the mouth, if desired, and the mirror can be replaced to the same angle or position by simply a movement of the lever D.

What I claim as new is—

1. In a holder for dental devices, the combination of a flexible bar arranged to conform to the face; means for attaching the bar in position on the face; a sliding block on the bar; and a mirror carried by the block.

2. In a holder for dental devices, the combination of a flexible bar arranged to conform to the face; means for attaching the bar in position on the face; a sliding block on the bar; a mirror, and a lever system connecting the mirror with the block, said lever system being provided with a universal joint.

3. In a holder for dental devices, the combination of a bar shaped to conform to the face between the nose and the mouth; means for holding it in this position; a sliding block on the bar; and a mirror carried by the block.

4. In a holder for dental devices, the combination of a bar arranged to be attached adjacent to the face; cross-pieces on said bar having means for engaging a rubber dam thereon, said cross-pieces being arranged to slide on said bar.

5. In a holder for dental devices, the combination of a flexible bar arranged to conform to the shape of the face and to be in position between the nose and mouth; and sliding cross-pieces on said bar, said cross-pieces being provided with means for engaging a rubber dam.

6. In a holder for dental devices, the combination of the cross-bar, A, arranged to conform to the shape of the face between the nose and mouth; the cross-pieces, I I, slidingly mounted thereon, having the outwardly-projecting points, $i'$ $i'$; the blocks, D, slidingly mounted on the bar; the lever system comprising the levers, D and E; joints formed of the sockets, C and $d'$; and the balls $d$ and $e$.

In testimony whereof I affix my signature in presence of two witnesses.

JAMES A. MEAD.

Witnesses:
RENA LANZA,
J. KEESE HALLECK.